(12) United States Patent
Juang

(10) Patent No.: US 9,223,949 B1
(45) Date of Patent: Dec. 29, 2015

(54) SECURE TRANSFORMABLE PASSWORD GENERATION

(71) Applicant: Google Inc., Mountain View, CA (US)

(72) Inventor: Philo Juang, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 80 days.

(21) Appl. No.: 13/625,531

(22) Filed: Sep. 24, 2012

Related U.S. Application Data

(62) Division of application No. 12/338,080, filed on Dec. 18, 2008, now Pat. No. 8,301,900.

(51) Int. Cl.
*G06F 21/31* (2013.01)
*H04L 9/32* (2006.01)

(52) U.S. Cl.
CPC .............. *G06F 21/31* (2013.01); *H04L 9/3226* (2013.01)

(58) Field of Classification Search
CPC .... G06F 21/31; G06Q 20/206; H04L 9/0861; H04L 9/3226; H04L 63/083; H04L 63/0846; H04L 2463/061; H04L 2463/081
USPC .................................. 713/184; 726/2, 3, 4, 5
See application file for complete search history.

(56) References Cited

U.S. PATENT DOCUMENTS

| | | | |
|---|---|---|---|
| 4,218,738 A * | 8/1980 | Matyas et al. .................. 705/72 |
| 5,590,197 A | 12/1996 | Chen et al. | |
| 7,484,089 B1 | 1/2009 | Kogen et al. | |
| 2003/0056096 A1 * | 3/2003 | Albert et al. .................. 713/168 |
| 2004/0034771 A1 * | 2/2004 | Edgett et al. .................. 713/168 |
| 2004/0172368 A1 * | 9/2004 | Johnson .......................... 705/64 |
| 2006/0036871 A1 * | 2/2006 | Champine et al. ............ 713/183 |
| 2008/0022356 A1 * | 1/2008 | Tanaka et al. .................... 726/1 |

* cited by examiner

*Primary Examiner* — Ellen Tran
(74) *Attorney, Agent, or Firm* — Lerner, David, Littenberg, Krumholz & Mentlik, LLP

(57) ABSTRACT

The invention relates to generating and using secure transformable passwords. In one example, a user grants a third party access to an online account at a host server, and the user requests a transformed password from the host server. The host server associates an encryption key with the third party and generates a transformed password using the user's online account password and the encryption key. The user transmits the transformed password to the third party which may use the transformed password to access the online account. The host server generates a second transformed password and compares it to the password information received from the third party. If the received password information and the second transformed password are identical, access is granted. The invention also includes methods for invalidating the transformed passwords by changing the encryption keys to an invalid state.

20 Claims, 7 Drawing Sheets

FIGURE 3a: Phase 1

FIGURE 3b: Phase 2

SECURE TRANSFORMABLE PASSWORD GENERATION

CROSS-REFERENCE TO RELATED APPLICATIONS

The present application is a divisional of U.S. patent application Ser. No. 12/338,080, filed on Dec. 18, 2008, the disclosure of which is incorporated herein by reference.

BACKGROUND OF THE INVENTION

1. Field of the Invention

The present invention relates generally to protecting online account passwords. More particularly, the invention relates to generating and using secure transformable passwords.

2. Description of Related Art

Generally, an Internet user employs a username and password for logging into online account systems such as e-mail, business accounts, shopping or other secure accounts. A given online account system or host server completes a login attempt if the information presented by the user is identical to the username and password stored in the host server's memory or at some other location accessible by the host server.

An Internet user may have several online accounts which require passwords. In some cases users with multiple accounts may rely on a small number of passwords, and repeat those passwords for multiple accounts. This makes it easier to remember and manage multiple accounts. However, if a user's online account password is stolen or compromised, this password may be used to access other online accounts where the user has chosen the same password.

A number of social networking and other websites have begun to operate which enable the user to share information with others. These websites collect information from a user's online accounts such as contacts, e-mails, pictures, videos, etc. These websites then allow users to share information with others. To facilitate this collection and sharing, a user grants the social networking site access to the user's online accounts.

In order to grant a social networking website or other third party access to the user's online account, the user must provide the user's login information, including the user's personal password. If the third party's security system is compromised or hacked, an individual user's personal data and password may be stolen. Any person or entity which obtains this information is able to login to a user's online account to obtain information. Because of the use of a limited number of passwords, the unauthorized person or entity may have access to numerous other online accounts of the user with a single password.

BRIEF SUMMARY OF THE INVENTION

Aspects of the present invention provide systems and methods for enhanced security in login-based applications.

In accordance with one embodiment of the present invention, a computer implemented method for providing and utilizing transformed passwords comprises associating an encryption key with a third party for use in accessing a user's account at a host server; generating a first transformed password by encrypting the user's original password using the associated encryption key; providing the first transformed password to the third party; receiving password information from the third party as part of a request to access the user's account; generating a second transformed password by encrypting the user's original password using the associated encryption key; comparing the received password information and the second transformed password; determining if the received password information and second transformed password are identical; and granting access to the user's account if the received password information and the second transformed password are identical.

In one alternative, the method further comprises receiving password information which is also the first transformed password.

In another alternative, the method further comprises storing the second transformed password at a host server.

In yet another alternative, the method further comprises the private encryption key being stored only at a third party.

In accordance with another embodiment of the present invention, a computer implemented method for invalidating transformed passwords to protect a user's original password, the method comprises generating an encryption key to a third party for use in accessing a user's account at a host server; creating a first transformed password by encrypting a user's original password using the associated encryption key; recognizing a breach associated with the third party or the associated encryption key; changing the associated encryption key to an invalid state based upon the breach, thereby invalidating the first transformed password.

In one alternative, the method further comprises generating a second transformed password using the associated encryption key and the user's original password; and storing the second transformed password at the host server. Upon recognizing a breach associated with the third party or the encryption key, generating a third transformed password using the invalid associated encryption key and the user's original password; deleting the stored second transformed password; and storing the third transformed password at the host server. In this case, the method further comprises a host server receiving password information from the third party; comparing the received password information and the third transformed password; and denying access to the host server if the received password information and the third transformed password are not identical.

In another alternative, the method further comprises a host server receiving password information from the third party; the host server generating a third transformed password by encrypting the user's original password using the invalid encryption key; comparing the received password information and the third transformed password; and denying the third party access to the host server if the received password information and the third transformed password are not identical.

In this case, the method further comprises receiving password information which is the first transformed password.

In another case, the method further comprises the third transformed password being stored only at the host server.

In yet another case, the method further comprises the associated encryption key, valid or invalid, being a private encryption key stored only at the host server.

In accordance with a further embodiment of the present invention, a computer implemented method for providing and utilizing transformed passwords, comprises associating a public encryption key with a complementary private encryption key to a third party for use in accessing a user's account at a host server; generating a transformed password by encrypting the user's original password using the public encryption key; providing the transformed password to the third party; receiving password information from the third party; applying the private encryption key to the received password information to obtain a result; comparing the result to the user's original password; and granting access to the user's account if the result and the user's original password are identical.

In one alternative, the method further comprises the received password being the transformed password.

In another alternative, the method further comprises the private encryption key being stored only at the host server.

In accordance with yet another embodiment of the present invention, a computer implemented method for invalidating transformed passwords to protect a user's original password, comprises providing a private and public encryption key pair; associating the public encryption key with a third party for use in accessing a user's account at a host server, thereby also associating the private encryption key to the third party; generating a transformed password by encrypting the user's original password using the public encryption key; recognizing a breach of the third party's security; changing the associated private encryption key to an invalid state based upon the breach, thereby invalidating the transformed password.

In one alternative, the method further comprises a host server receiving password information from the third party; the host server applying the invalidated associated private encryption key to the received password information to obtain a result; comparing the result to the user's original password; and denying access to the host if the result and the user's original password are not identical. In this case, the method may further comprise the received password information being the transformed password.

In accordance with a further embodiment of the present invention, a host server apparatus includes a processor means for managing access requests to a user's on-line account information by third parties. The processor means is operable to receive a request for a transformed password; associate an encryption key with a third party for use in accessing the user's account at the host server apparatus; generate a first transformed password by applying the associated encryption key to a user's original password; and transmit the transformed password so that the transformed password is usable by the third party.

In an alternative, the processor is further operable to receive password information from the third party; generate a second transformed password by applying the associated encryption key to the user's original password; compare the received password information and second transformed password; and grant access to the user's account if the received password information and the second transformed password are identical. In this case, the processor means may be further operable to securely store the encryption key in memory.

In accordance with another embodiment of the present invention, a host server apparatus includes processor means for managing access requests to a user's on-line account information by third parties. The processor means is operable to receive a request for a transformed password; provide a private and public encryption key pair; associate the public encryption key with a third party for use in accessing the user's account at the host server apparatus, thereby also associating the private encryption key to the third party; generate a transformed password by applying the associated public encryption key to a user's original password; and transmit the transformed password so that it is usable by the third party.

In one alternative, the processor means is further operable to receive password information from the third party; generate a result by applying the associated private encryption key to the received password information; compare the result to the user's original password; and grant access to the user's account if the result is identical to the user's original password.

In another alternative, the processor means is further operable to securely store the private encryption key in memory.

In accordance with another embodiment of the present invention, a user device is connected to a third party and a host server through a network. The user device includes a processor means. The processor means is operable to grant the third party access to a user's account at the host server on the user's behalf; request a transformed password from the host server; and provide the third party with the transformed password.

In one alternative, the processor means is further operable to display to display information regarding granting the third party access to the host server on the user's behalf.

In another alternative, the processor means is further operable to notify host server of a breach of the user device's security.

In accordance with a further embodiment of the present invention, a third party apparatus is connected to a host server and a user. The apparatus includes processor means for accessing an account at a host server on behalf of a user. The processor means is operable to request access to the host server on behalf of the user; receive a transformed password from the host server or the user, the transformed password being formed by encrypting the user's original password with an encryption key associated with the apparatus; transmit the transformed password to the host server; and access the user's account information upon validation of the transformed password by the host server.

DETAILED DESCRIPTION

The aspects, features and advantages of the present invention will be appreciated when considered with reference to the following description of preferred embodiments and accompanying figures. The following description does not limit the present invention; rather, the scope of the invention is defined by the appended claims and equivalents.

Figure 1:
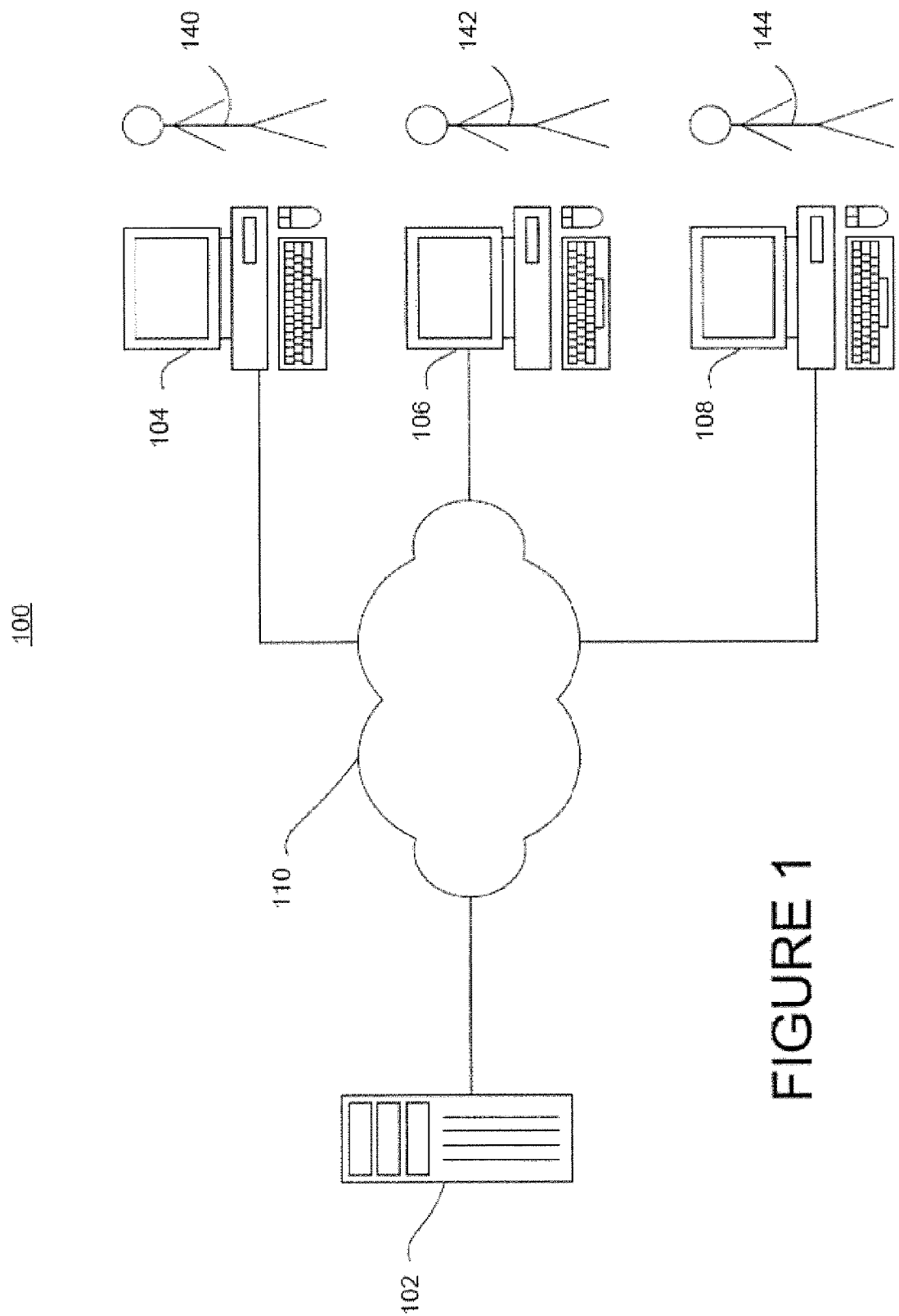
FIG. 1 depicts a computer network for use with aspects of the invention.

As shown in FIG. 1, a system 100 in accordance with one aspect of invention comprises computers in communication with one another. A host server 102 and user systems 104, 106 and 108 are capable of direct and indirect communication with other computers, such as over a network 110. Although only a few computers are depicted in FIG. 1, it should be appreciated that a typical system can include a large number of connected servers and users, with each different computer being at a different node of the network. The network 110, and any intervening nodes, may comprise various configurations and protocols including the Internet, intranets, virtual private networks, wide area networks, local networks, private networks using communication protocols proprietary to one or more companies, Ethernet, Wi-Fi and HTTP. The communication may be facilitated by any device capable of transmitting data to and from other computers, such as modems (e.g., dial-up or cable), network interfaces and wireless interfaces. Host server 102 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Figure 2:
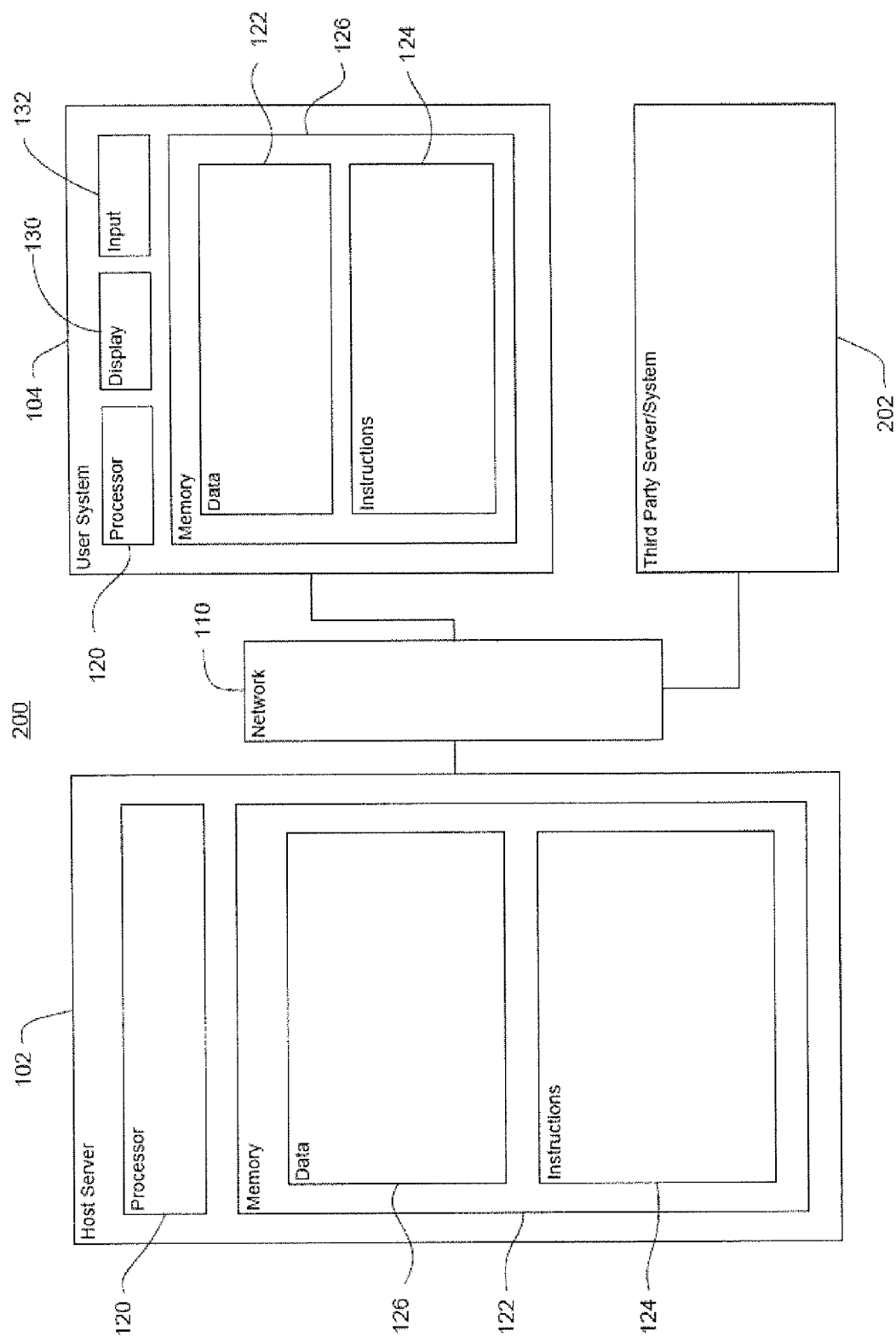
FIG. 2 depicts a user system, a host server and a third party entity connected through the Internet in accordance with aspects of the invention.

FIG. 2 depicts a system 200 which may include a user system 104 and a third party 202 connected to the host server 102 through network 110. The host server 102 may contain a processor 120, memory 122 and other components typically present in a computer.

Memory 122 stores information accessible by processor 120, including instructions 144 that may be executed by the processor 120 and data 126 that may be retrieved, manipulated or stored by the processor. The memory may be of any type capable of storing information accessible by the processor, such as a hard-drive, ROM, RAM, CD-ROM, write-capable or read-only memories.

The processor 120 may comprise any number of well known processors, such as processors from Intel Corporation. Alternatively, the processor may be a dedicated controller for executing operations, such as an ASIC.

Data 126 may be retrieved, stored or modified by processor 120 in accordance with the instructions 124. The data may be stored as a collection of data. For instance, although the invention is not limited by any particular data structure, the data may be stored in computer registers, in a relational database as a table having a plurality of different fields and records. The data may also be formatted in any computer readable format such as, but not limited to, binary values, ASCII or EBCDIC (Extended Binary-Coded Decimal Interchange Code). Data 126 may also include associated encryption keys and corresponding user data and/or third party information.

Although the processor 120 and memory 122 are functionally illustrated in FIG. 2 as being within the same block, it will be understood that the processor and memory may actually comprise multiple processors and memories that may or may not be stored within the same physical housing or location. The processor may actually comprise a collection of processors which may or may not operate in parallel.

In one aspect, host server 102 communicates with one or more computers 104, 106, 108 and 202. Each such computer may be configured similarly to the server 102, with a processor, memory and instructions, as well as a user input device 170 and a user output device, such as display 160. Each user's computer may be a general purpose computer, intended for use by a user such as users depicted in 140, 142, or 144 (see FIG. 1). Each such computer may have all of the internal components normally found in a personal computer such as a central processing unit (CPU), display 130, CD-ROM/DVD-ROM, hard-drive, mouse, keyboard, touch-sensitive screen, speakers, microphone, modem and/or router (telephone, cable or otherwise) and all of the components used for connecting these elements to one another.

Moreover, computers in accordance with the systems and methods described herein may comprise any device capable of processing instructions and transmitting data to and from humans and other computers, including network computers lacking local storage capability, PDA's with modems and Internet-capable wireless phones.

Figure 3:
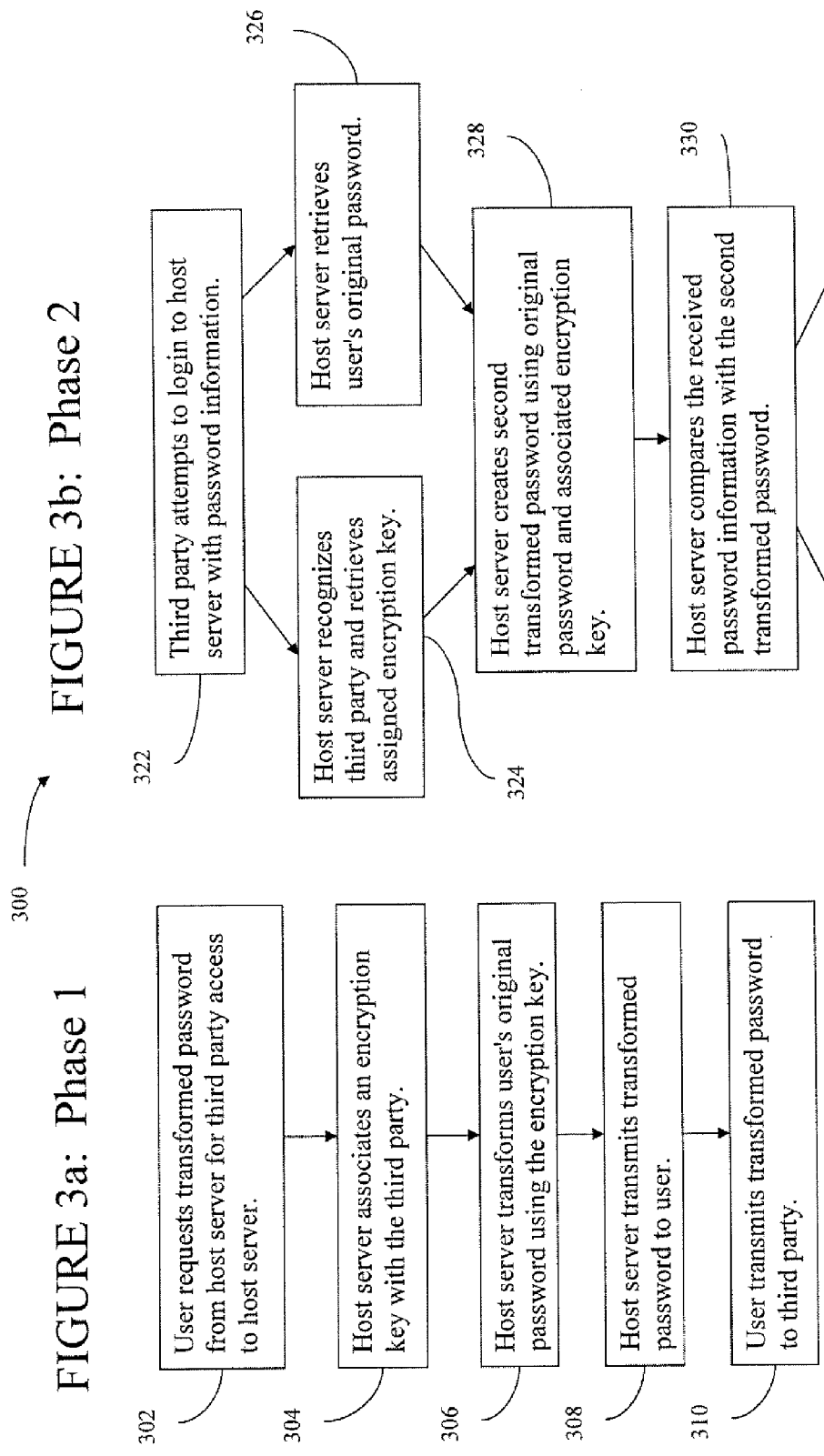
FIGS. 3a and 3b depict methods for providing and utilizing secure transformable passwords in accordance with aspects of the invention.

An aspect of the present invention is a method of generating and using secure transformable passwords, such as method 300 shown in FIGS. 3a and 3b. In one embodiment of the invention, FIG. 3a depicts a first phase for generating transformed passwords. A user such as user 140 has an account with a host server 102 which the user 140 may access with the user's original password. The user 140 may grant access to the user's account to a third party 202. The third party 202 may be a website or any other system, entity or individual authorized to access the user's account. As shown in box 302, the user sends a request to the host server 102 for a transformed password for use by the third party 202.

As shown in box 304, an encryption key is assigned or otherwise associated to the third party 202. The encryption key may be assigned or otherwise associated by host server 102, user computer 104, or another entity. The encryption key may be a private key employing exemplary methods such as AES, DES or any other encryption method. Private encryptions keys, for example those created by methods such as AES or DES, are desirably stored only at the host server 102 as a further layer of security. In this case, the host server 102 preferably securely maintains the private encryption keys so that they are not accessible to external users or third parties.

Once the encryption key has been assigned or otherwise associated to the third party 202, a transformed password for that third party 202 may be obtained as shown in block 306. The user 140 gives the user's original password to the host server 102. The user's original password is transformed by applying the encryption key associated with the third party. The result is a first transformed password or "hash." By using and assigning different encryption keys to different third parties, multiple hashes may be generated from a single password.

The first transformed password may be generated in a number of different ways. In one example, the user 140 may request the first transformed password manually from the host server 102. As shown in box 308, host server 102 may then transmit the transformed password to the user 140. As shown in box 310, the user 140 may then transmit the first transformed password to the third party 202. In another example, the host server 102 generates the first transformed password by displaying a popup, JavaScript API or the like requesting the user's original password, generating the first transformed password based upon input of the user's original password, and delivering the first transformed password to the third party 202.

FIG. 3b depicts a second phase of method 300, which illustrates a process of using the transformed password. As shown in box 322, the third party 202 submits password information to the host server 102 to login to the user's account. This password information may or may not be the first transformed password. In box 324, the host server 102 identifies the third party 202, either through IP detection or some other means, and retrieves the encryption key information associated with the third party 202. In box 326, the host server 102 also retrieves the user's original password.

As shown in box 328, the user's original password is transformed using the encryption key previously assigned to or otherwise associated with the third party 202. This results in a second transformed password which may be maintained by the host server 102. The step of generating a second transformed password may occur at anytime, that is before the first transformed password is generated, after the first transformed password is generated, after the third party has attempted to login with the first transformed password, or simultaneously during any of the aforementioned events. The second transformed password may therefore be stored at the host server 102 and retrieved when the third party 202 attempts to login to the host server 102 rather than generated after the third party 202 attempts to login. In this case, it is preferred that the transformed passwords are stored such that they may be deleted if all or fewer than all of the transformed passwords are compromised.

As shown in box 330, the second transformed password is compared to the received password information entered by the third party, which may or may not be the first transformed password. As shown in box 332, if the received password information and the second transformed password are identical, the login attempt is validated and access is granted. In contrast, as shown in box 334, if the received password information is not identical to the second transformed password, the login attempt fails and access is denied.

Figure 4:
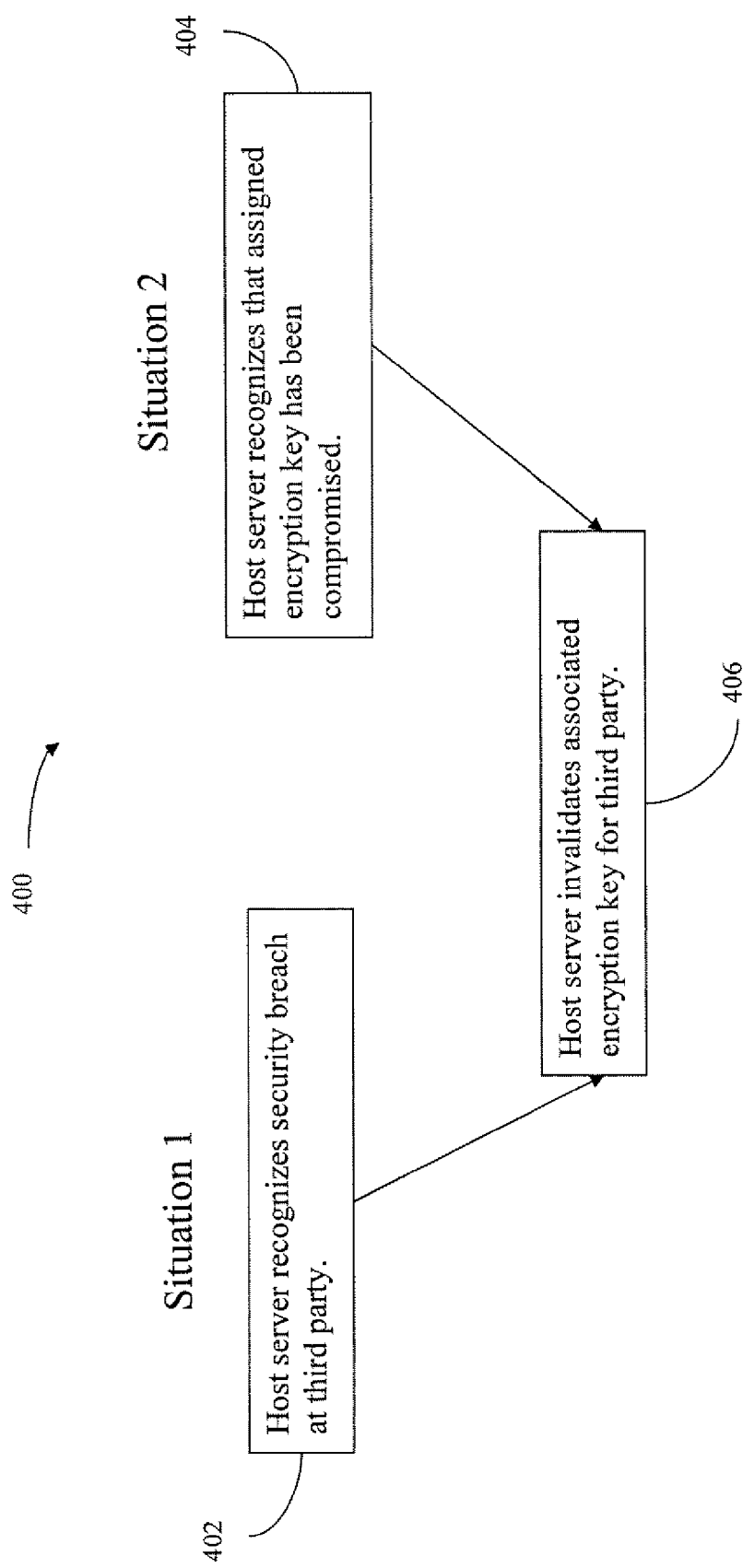
FIG. 4 depicts methods for invalidating secure transformable passwords in accordance with aspects of the invention.

FIG. 4 depicts two situations for invalidating secure transformable passwords. As shown in the first situation at box 402, the third party's security may have been breached such as by a hacker or equipment theft. A security breach may be detected by the host server 102 (or other entity) if for example there are numerous login attempts to multiple accounts by a single third party. Or a breach may be determined from reports by a user or by the third party itself. In an alternative situation presented in box 404, the encryption key associated with third party 202 has been compromised. As shown here, the host server 102 recognizes that the encryption key associated with the third party has been compromised.

For example, host server 102 may detect a large number of requests generated from a single source. Generally, authorized users may stagger requests over time and may use multiple servers to make the requests to avoid overwhelming the host server 120. A hacker or unauthorized user, not knowing how long access to the host server 120 will be valid, may generate a large number of requests in a small period of time. The host server 120 may also detect if a single computer is making an unusual number of requests, even if those requests are staggered over time. These situations suggest that an unauthorized user is going through a list of compromised passwords to determine which if any will grant the unauthorized user access to the host server 120. Thus, given such information, the host server 120 would be able to identify that certain encryption keys have been compromised.

After the situation has been identified, the host server 102 may invalidate the associated encryption key by reassigning or otherwise changing the encryption key data for the third party to an invalid state as shown in box 406. A third transformed password will be generated which is no longer identical to the first transformed password, thereby invalidating the first transformed password. The first transformed password may also be invalidated by being flagged or otherwise identified as invalid. This process may also invalidate all other transformed passwords created by using the encryption key associated with the third party and therefore may protect additional users as well. For instance, if multiple transformed passwords have been generated for different third parties, each of these transformed passwords may be invalidated simultaneously at the host server 102.

Figure 5:
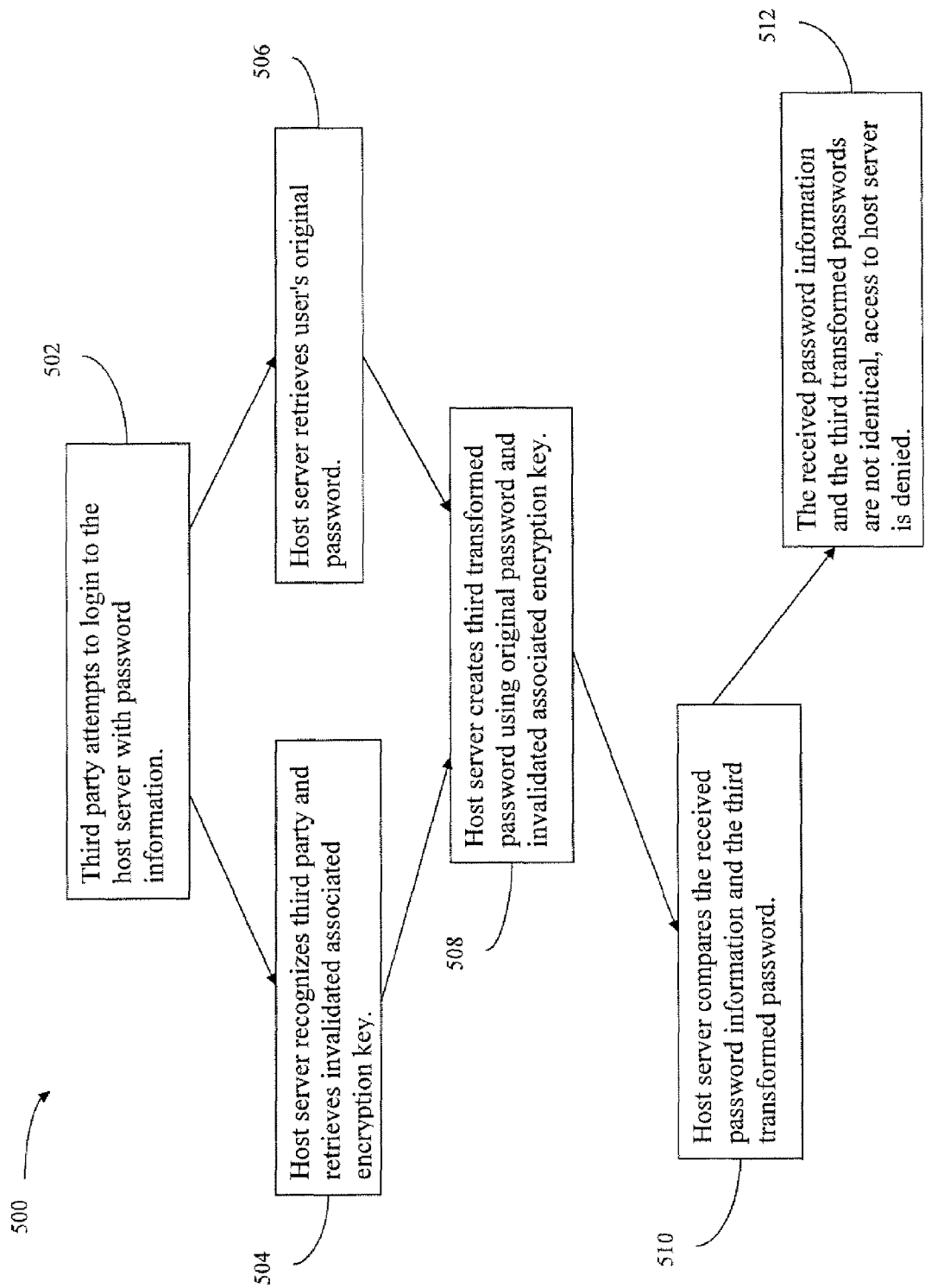
FIG. 5 depicts methods of invalidating encryption keys in accordance with aspects of the invention.

As depicted in flow diagram 500 of FIG. 5, a third party 202 which attempts to login to the host server 102 with the invalidated first transformed password or any other password will be denied access to the host server 102. For instance, as shown in box 502, the third party logs into to host server 102 with password information which may be the first transformed password. As shown in boxes 504 and 506, the host server 102 recognizes the third party and retrieves the invalidated associated encryption key and the user's original password. As shown in box 508, the host server 102 creates a third transformed password by applying the invalidated associated encryption key to the original password.

Again, this third transformed password, obtained at box 500, may be generated at anytime after the associated encryption key has been invalidated. For example, the third transformed password may be generated immediately after the associated encryption key has been invalidated, after the third party attempts to login with the first transformed password, or simultaneously with any of the aforementioned events. The third transformed password may therefore be stored at the host server 102 and retrieved when the third party 202 attempts to login to the host server 102 rather than generated after the third party 202 attempts to login. In this case, it is preferred that the transformed passwords are stored such that they may be deleted if one or more of the transformed passwords are compromised.

As shown in box 510, the host server 102 compares the third transformed password with the received password information. As shown in box 512, the third transformed password created by applying the invalidated encryption key to the user's original password is not identical to the received password information. Accordingly, access to the host server 102 is denied. Nonetheless, the user's original password remains intact.

Figure 6B:
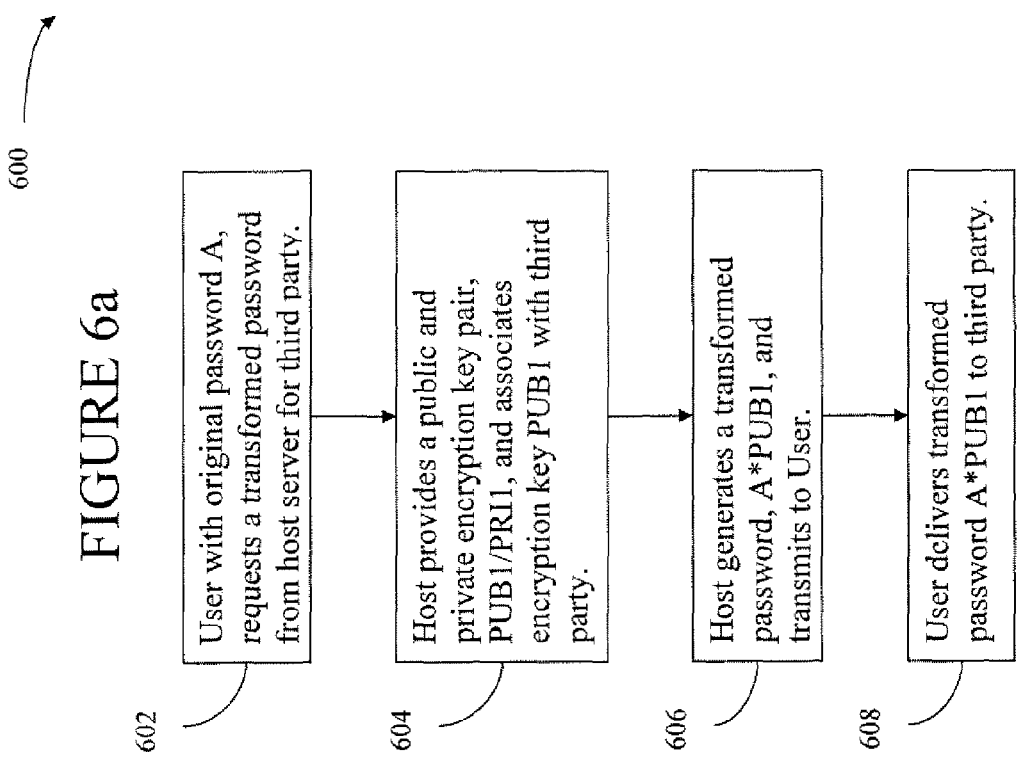
FIGS. 6a and 6b depict methods for providing and utilizing secure transformable passwords in accordance with additional aspects of the invention.
Figure 6A:
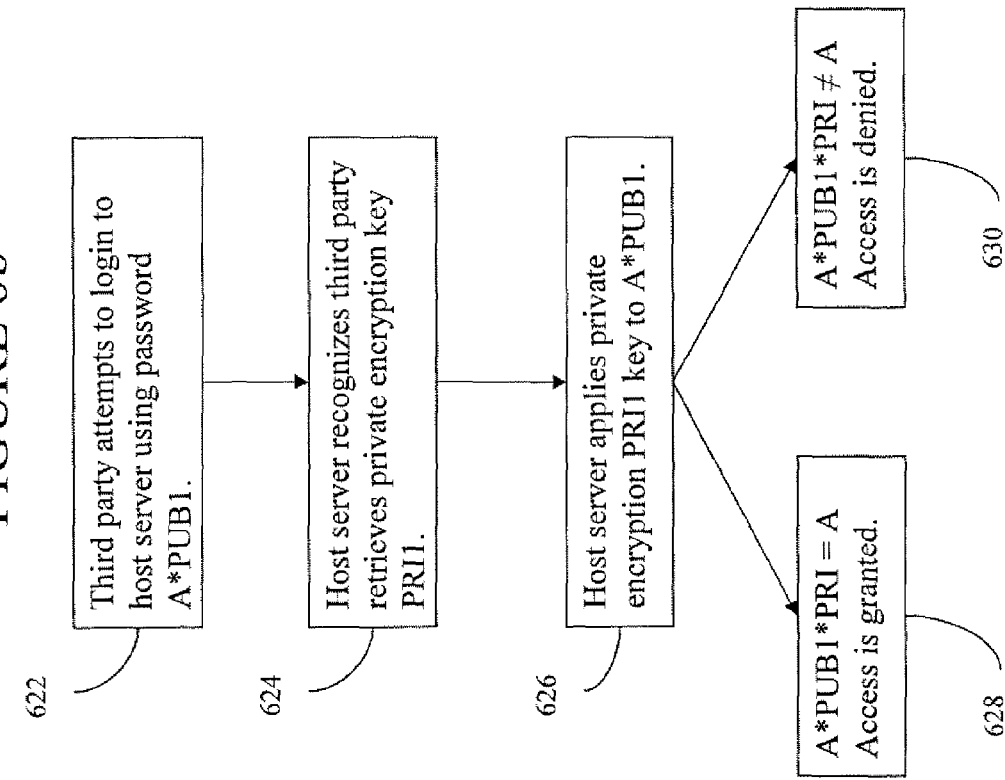

In another embodiment of the invention, FIGS. 6a, and 6b depict a method 600 for generating and using secure transformable passwords. FIG. 6a illustrates a process using private and public encryption key pairs, for example those generated by PGP encryption. These private and public encryption key pairs are such that the successive operations of the public encryption key and the private encryption key upon the user's original password generate a result identical to the user's original password.

The private encryptions keys of the public and private encryption key pairs are desirably stored only at the host server 102 as a further layer of security. In this case, the host server 102 preferably securely maintains the private encryption keys so that they are not accessible to external users or third parties. The public encryption keys may be given to anyone and stored at one or more locations, including for example, in the host server's memory 122 or some other location within the host server 120, in some outside secure location where the host server 102 has access, or in the user's computer 104.

Again, the transformed password may be generated in a number of different ways. In one example shown in box 602, a user such as user 140 requests a transformed password from a host server 102 for a third party 202. Alternatively, the user may submit a list of entities to the host server 102 to which it gives authorization. In this case, the third party(ies) may communicate with the host server 102 to request a transformed password. In box 604, the host server 102 provides a private and public encryption key pair and assigns or otherwise associates a public encryption key with a third party 202. In box 606, the host server 102 generates a transformed password using the user's original password and the public encryption key. The user 140 then delivers the transformed password to the third party 202, as shown in box 608. In box 608, "A" denotes the user's original password, "PUB1" denotes the associated public encryption key, and "PRI1" denotes the corresponding private encryption key. A*PUB1 denotes the transformed password.

In another example, the host server 102 generates the transformed password by displaying a popup, JavaScript API or the like requesting the user's original password, generating the first transformed password upon input of the user's original password, and delivering the first transformed password to the third party 202.

FIG. 6b depicts a login attempt by the third party. The third party 202 attempts to login to the host server 102 using password information which may or may not be the transformed password. As shown in box 622, the third party has attempted to login to the server using the transformed password. In box 624, the host server 102 recognizes the third party 202 and retrieves the private encryption key. In box 626, the host server 102 applies the corresponding private encryption key to the received password information, in this example, the transformed password. If the result of the second transform is identical to the user's original password, access to the host server 102 is granted, as shown in box 628. If the result of the second transform is not identical to the user's original password, access to the host server 102 is denied, as shown in box 630. In this example, neither the user's original password nor the private encryption key leaves the host server 102.

Figure 7:
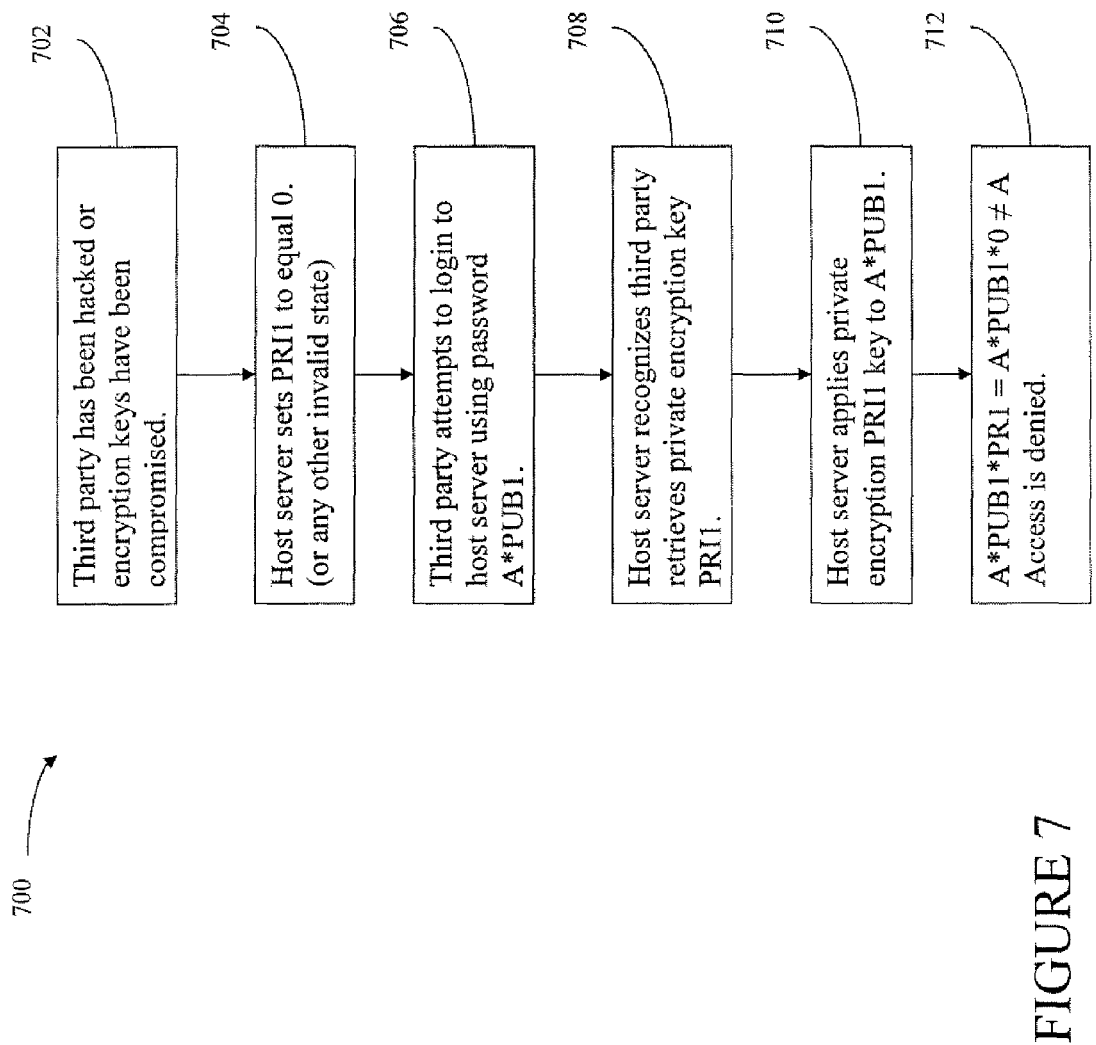
FIG. 7 depicts a method for invalidating secure transformable passwords in accordance with aspects of the invention.

In some cases it is desirable to prevent access by third party entities, such as when a user's account information has been compromised. FIG. 7 depicts a method 700 for invalidating a transformed password. As shown in box 702, the third party 202 may have been hacked or otherwise compromised. As shown in box 704, host server 102 changes the private encryption key to an invalid state. The third party 202 attempts to login to the host server 102 using password information which may or may not be the transformed password. As shown in the example in box 706, the third party attempts to login to the host server using the transformed password. In box 708, the host server recognizes the third party 202 and retrieves the corresponding private encryption key. The host server 102 applies the corresponding private encryption key to the received password information, in this example, the transformed password, and the result is no longer the user's original password. As shown in box 712, this results in access to the host server 102 being denied.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Furthermore, while certain operations and processes are shown in a particular order, aspects of the invention may be performed in a different order unless expressly required or stated herein. Finally, the various embodiments may employ any feature of any other embodiment unless expressly stated to the contrary.

The invention claimed is:

1. A computer implemented method for invalidating transformed passwords to protect a user's original password, the method comprising:
associating, by one or more server computing devices, a first encryption key having a first value with a third party for use in accessing a user's account;
creating, by the one or more server computing devices, a first transformed password by encrypting a user's original password using the first value of the associated first encryption key;
providing, by the one or more server computing devices, the first transformed password to the third party for accessing the user's account, wherein the third party cannot obtain the user's original password;
recognizing, by the one or more server computing devices, a breach associated with the third party or the associated first encryption key;
changing, by the one or more server computing devices, the first value of the associated first encryption key to a new value based upon the breach;
receiving, by the one or more server computing devices from the third party, a request for access including the first transformed password;
using, by the one or more server computing devices, the new value of the first encryption key and the user's original password to create a second transformed password;
comparing, by the one or more server computing devices, the received first transformed password to the second transformed password; and
when the comparison indicates that the first transformed password and the second transformed password are different, denying, by the one or more server computing devices, the request for access.

2. The method of claim 1, further comprising:
generating a third transformed password using the first value of the associated first encryption key and the user's original password;
storing the third transformed password at the host server; upon recognizing the breach,
deleting the stored third transformed password; and
storing the second transformed password at the host server, wherein creating the second transformed password is performed upon recognizing the breach.

3. The method of claim 2, further comprising:
receive password information from the third party;
comparing the received password information and the third transformed password; and
permitting access to the host server when the received password information and the second transformed password are identical.

4. The method of claim 1, wherein the associated first encryption key is a private encryption key stored only at one of the one or more server computing devices.

5. The method of claim 1, further comprising:
in response to receiving the request, identifying the third party based on a network address of the third party; and
based on the identification, retrieving the associated first encryption key associated with the third party and the user's original password in order to create the second transformed password.

6. The method of claim 1, wherein the second transformed password is created in response to receiving the request for access.

7. The method of claim 1, further comprising:
before recognizing the breach, receive a request to access particular information, the request to access the particular information including the first transformed password;
use the first value of the first encryption key and the user's original password to create a third transformed password;
comparing the received first transformed password to the third transformed password; and
when the first transformed password and the second transformed password are identical, provide access to the particular information.

8. A system for invalidating transformed passwords to protect a user's original password, the system comprising one or more server computing devices having one or more processors configured to:
- associate a first encryption key having a first value with a third party for use in accessing a user's account;
- create a first transformed password by encrypting a user's original password using the first value of the associated first encryption key;
- provide the first transformed password to the third party for accessing the user's account, wherein the third party cannot obtain the user's original password;
- recognize a breach associated with the third party or the associated first encryption key;
- change the first value of the associated first encryption key to a new value based upon the breach;
- receive, from the third party, a request for access including the first transformed password;
- use the new value of the first encryption key and the user's original password to create a second transformed password;
- compare the received first transformed password to the second transformed password; and
- when the comparison indicates that the first transformed password and the second transformed password are different, deny the request for access.

9. The system of claim 8, wherein the one or more processors are further configured to:
- generate a third transformed password using the first value of the associated first encryption key and the user's original password;
- store the third transformed password at the host server;
- upon recognizing the breach, delete the stored third transformed password; and
- store the second transformed password at the host server, wherein creating the second transformed password is performed upon recognizing the breach.

10. The system of claim 9, wherein the one or more processors are further configured to:
- receive password information from the third party;
- compare the received password information and the third transformed password; and
- permit access to the host server when the received password information and the second transformed password are identical.

11. The system of claim 8, wherein the associated first encryption key is a private encryption key stored only at one of the one or more server computing devices.

12. The system of claim 8, wherein the one or more processors are further configured to:
- in response to receiving the request, identifying the third party based on a network address of the third party; and
- based on the identification, retrieving the associated first encryption key associated with the third party and the user's original password in order to create the second transformed password.

13. The system of claim 8, wherein the second transformed password is created in response to receiving the request for access.

14. The system of claim 8, wherein the one or more processors are further configured to:
- before recognizing the breach, receive a request to access particular information, the request to access the particular information including the first transformed password;
- use the first value of the first encryption key and the user's original password to create a third transformed password;
- compare the received first transformed password to the third transformed password; and
- when the first transformed password and the second transformed password are identical, provide access to the particular information.

15. A non-transitory, computer readable storage medium on which instructions are stored, the instructions when executed by one or more processors cause the one or more processors to perform a method of invalidating transformed passwords to protect a user's original password, the method comprising:
- associating a first encryption key having a first value with a third party for use in accessing a user's account;
- creating a first transformed password by encrypting a user's original password using the first value of the associated first encryption key;
- providing the first transformed password to the third party for accessing the user's account, wherein the third party cannot obtain the user's original password;
- recognizing a breach associated with the third party or the associated first encryption key;
- changing the first value of the associated first encryption key to a new value based upon the breach;
- receiving, from the third party, a request for access including the first transformed password;
- using the new value of the first encryption key and the user's original password to create a second transformed password;
- comparing the received first transformed password to the second transformed password; and
- when the comparison indicates that the first transformed password and the second transformed password are different, denying the request for access.

16. The medium of claim 15, wherein the method further comprises:
- generating a third transformed password using the first value of the associated first encryption key and the user's original password;
- storing the third transformed password at the host server;
- upon recognizing the breach, deleting the stored third transformed password; and
- storing the second transformed password at the host server, wherein creating the second transformed password is performed upon recognizing the breach.

17. The medium of claim 16, wherein the method further comprises:
- receiving password information from the third party;
- comparing the received password information and the third transformed password; and
- permitting access to the host server when the received password information and the second transformed password are identical.

18. The medium of claim 15, wherein the associated first encryption key is a private encryption key stored only at one of the one or more server computing devices.

19. The medium of claim 15, wherein the method further comprises:
- in response to receiving the request, identifying the third party based on a network address of the third party; and
- based on the identification, retrieving the associated first encryption key associated with the third party and the user's original password in order to create the second transformed password.

20. The medium of claim 15, wherein the method further comprises:
- before recognizing the breach, receiving a request to access particular information, the request to access the particular information including the first transformed password;
- using the first value of the first encryption key and the user's original password to create a third transformed password;
- comparing the received first transformed password to the third transformed password; and
- when the first transformed password and the second transformed password are identical, providing access to the particular information.

* * * * *